United States Patent [19]
Carbone

[11] 3,937,874
[45] Feb. 10, 1976

[54] OFFSET VOLTAGE CORRECTION CIRCUIT FOR MULTIPLE VIDEO CHANNEL IMAGER

[75] Inventor: Joseph Carbone, Liverpool, N.Y.

[73] Assignee: General Electric Company, Syracuse, N.Y.

[22] Filed: Jan. 9, 1975

[21] Appl. No.: 539,897

[52] U.S. Cl. .................. 178/7.1; 357/24; 328/163; 178/DIG. 26
[51] Int. Cl.$^2$.. H04N 3/16; H01L 29/78; H03B 1/00
[58] Field of Search........... 178/7.3 D, 7.1, DIG. 26, 178/7.3 DC; 357/24, 45, 30, 41; 307/304, 311; 250/211 J, 578; 328/163

[56] References Cited
UNITED STATES PATENTS

| | | | |
|---|---|---|---|
| 3,653,014 | 3/1972 | List et al. | 328/163 |
| 3,786,263 | 1/1974 | Michon | 357/24 |
| 3,801,820 | 4/1974 | Eichelberger et al. | 178/7.1 |
| 3,819,953 | 6/1974 | Puckette et al. | 357/24 |

Primary Examiner—Albert J. Mayer
Assistant Examiner—R. John Godfrey

[57] ABSTRACT

An imaging system comprising an array of sensing sites of MIS cell pairs which are arranged in a matrix of rows and columns; a plurality of column conductor lines arranged in a plurality of consecutively numbered sets, each set including the same number of consecutively numbered lines; a plurality of charge integrating means, each being connected to a respective column line of each set for simultaneous readout of an induced current through the column lines of a set; a plurality of video channel circuit respectively in circuit with each of the integrating means; switch means for connecting each set, in turn, for readout; and a correction circuit means connected in circuit with each said plurality of video channel circuit means for generating a correction signal to cancel the D.C. offset voltage between the outputs of said video channels.

16 Claims, 28 Drawing Figures

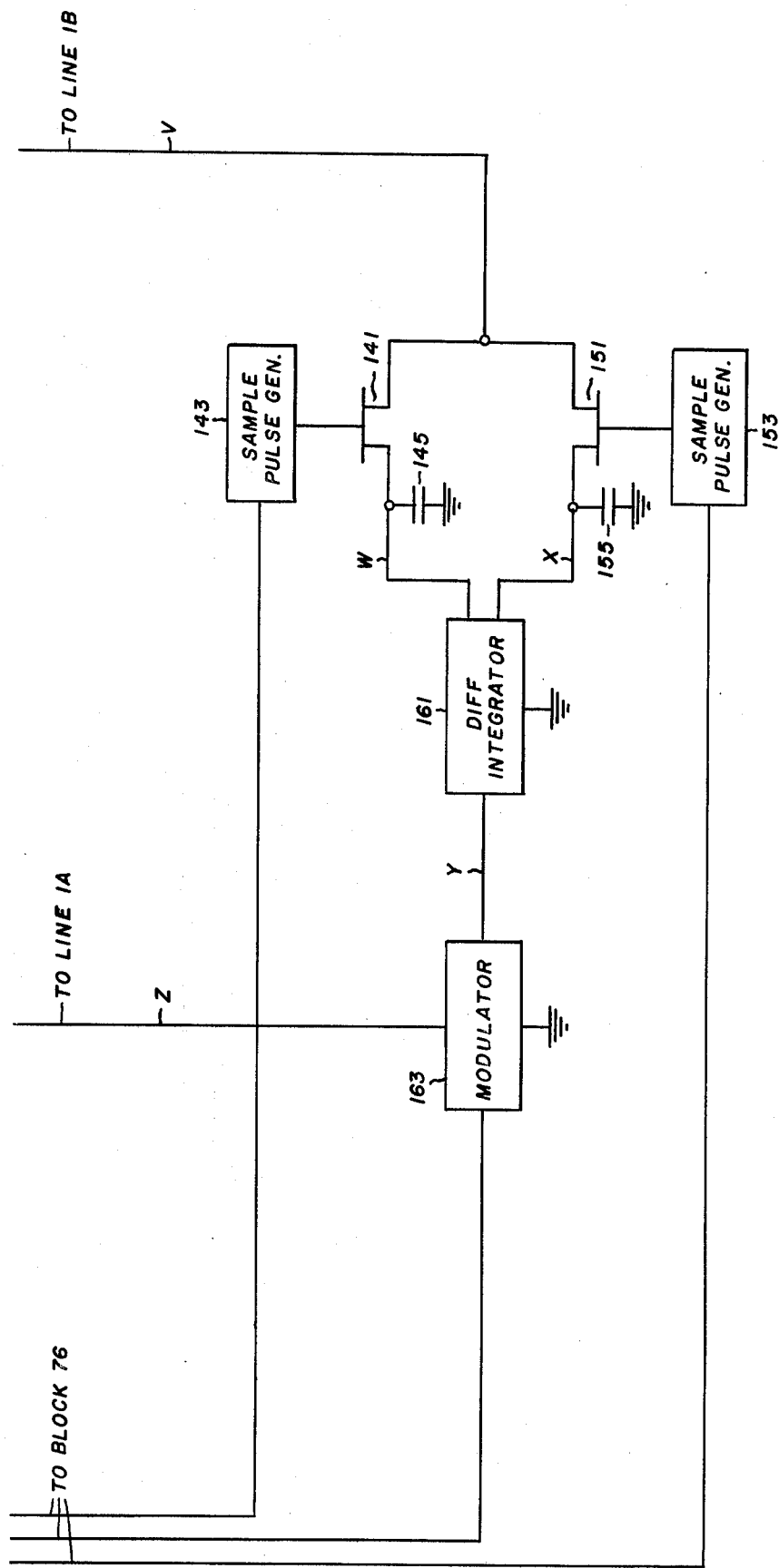

OFFSET VOLTAGE CORRECTION CIRCUIT FOR MULTIPLE VIDEO CHANNEL IMAGER

The invention herein described was made under a contract or subcontract thereunder, (or grant) with the United States Army.

BACKGROUND OF THE INVENTION

This invention relates in general to apparatus including devices and circuits therefor for sensing radiation and developing electrical signals in accordance therewith. The present invention relates in particular to such apparatus which senses and stores charge produced by electromagnetic radiation flux and which provides an electrical readout of the stored charge.

This application relates to improvements in the apparatus of copending patent application Ser. No. 441,054, now U.S. Pat. No. 3,890,500, filed Feb. 11, 1974, in the name of Eichelberger et al. and assigned to the assignee of this invention. The Eichelberger et al. application is hereby incorporated herein by reference.

The Eichelberger application Ser. No. 441,054, now U.S. Pat. No. 3,890,500, discloses a two-dimensional array of radiation sensing sites each comprised of a pair of coupled MIS (metal-insulator-semiconductor) capacitive cells. One cell of each cell pair is arranged to form the rows of array and the other cell of each cell pair is arranged to form the columns of the array. Readout of a row of sensing sites of the array is performed by a scanning technique of reducing the voltage on the row conductor line to cause the charge stored in the row oriented cells to flow to the column oriented cell coupled respectively thereto and thereafter, in turn, reducing the voltage on the column conductor lines to inject the stored charge into the substrate. This causes a current to flow in each column line. The column conductor lines are arranged in a plurality of consecutively numbered sets, each set including the same number of consecutively numbered column lines. Each of a plurality of charge integrating means are connected between a respective column line of a set and ground for simultaneous readout of the current flowing through the column lines of a set. A video channel circuit is associated with each of the integrating means for processing the signal from each set. The video signals from each video channel may be multiplexed to obtain a composite video signal.

It has been discovered when using the aforementioned readout techniques in which multiple readout circuits, each comprising a charge integrating means and a video channel circuit, that it is difficult to match the electrical characteristics of the circuit components of the readout circuits. When unmatched, a D.C. error or offset voltage is introduced into the composite video signal. This causes a display of a video frame of information to have columns of alternating intensity.

It is an object of this invention to provide improved surface charge storage devices and methods of operating such devices.

Another object of this invention is to provide arrays of sensing elements and readout circuits therefor of the kind described above in which a plurality of sensing sites may be simultaneously addressed for readout and the composite video signal generated thereby is substantially free of D.C. error voltages associated with such readout circuits.

SUMMARY OF THE INVENTION

In accomplishing the aforementioned objects and other objects which will be apparent from a consideration of the following detailed description and accompanying claims, an imaging system is provided comprising an array of sensing sites of MIS cell pairs which are arranged in a matrix of rows and columns, a plurality of column conductor lines arranged in a plurality of consecutively numbered sets, each set including the same number of consecutively numbered lines, a plurality of charge integrating means each of which being connected to a respective column line of each set for simultaneous readout of an induced current through the column lines of a set; a plurality of video channel circuits respectively in circuit with each of the integrating means; and a correction circuit means connected in circuit with each of said plurality of video channel circuit means for generating a correction signal to cancel a D.C. offset voltage between the outputs of said video channels.

BRIEF DESCRIPTION OF THE DRAWINGS

FIGS. 1A and 1B are a block diagram of an imaging system which has an array of radiation responsive MIS cells and an associated circuit for generating a video signal in accordance with this invention.

BRIEF DESCRIPTION OF THE PREFERRED EMBODIMENT

Figure 1A:
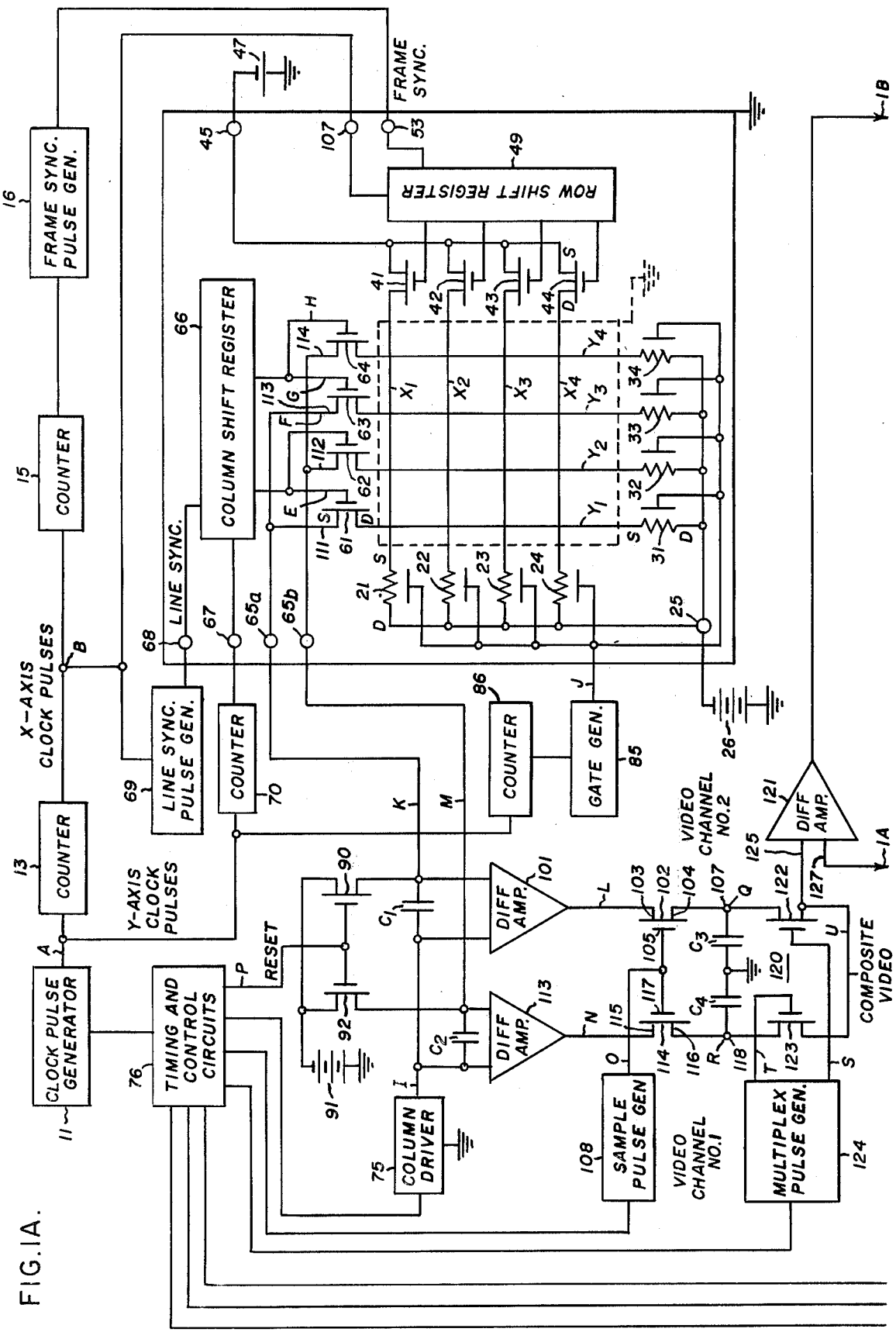

Referring now to FIG. 1, there is shown a block diagram of radiation detection apparatus or system including a two-dimensional image sensing array 10 which provides a video signal in response to radiation image on the array by a lens system (not shown) for example. The video signal may be applied to a suitable display device (not shown) such as a cathode ray tube as described in U.S. Pat. No. 3,786,263 issued on Jan. 15, 1974, to Michon and assigned to the assignee of the invention herein, along with sweep voltages synchronized with the scanning of the array to convert the video signal into a visual display of the image.

The array 10 is comprised of sensing sites of pairs of coupled metal-insulator-semiconductor (hereinafter MIS) radiation sensing cells suitably arranged to form a two-dimensional array. One MIS cell of each pair is arranged to form "X"-directional rows of the array 10 and the other MIS cell of each pair is arranged to form "Y"-directional columns of the array 10.

The image sensing array 10 and the MIS cells (not shown) of which it is comprised may be fabricated using a variety of materials and in variety of sizes in accordance with established techniques for fabricating integrated circuits as described in the aforementioned Michon patent.

Additional details of the structural features of an array in accordance with the preferred embodiment of this invention is described in the aforementioned Eichelberger patent application Ser. No. 441,054, Pages 15–18, now U.S. Pat. No. 3,890,500.

Details of the operation of a coupled pair of such cells using the readout technique of integrating the current flow in one of the address lines as utilized in this invention is described in the aforementioned Eichelberger patent application Ser. No. 441,054, Pages 10–15, now U.S. Pat. No. 3,890,500.

Figure 2A:
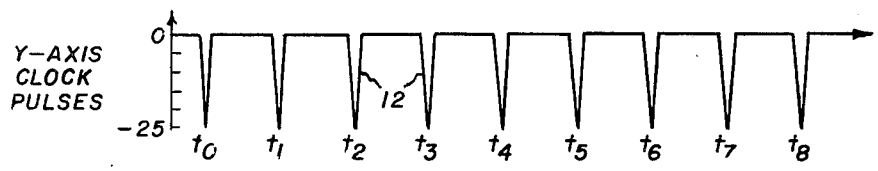
FIGS. 2A through 2Z are diagrams of amplitude versus time of voltage signals occurring at various points in the system of FIGS. 1A and 1B which points are identified in FIGS. 1A and 1B by a literal designation corresponding to the literal designation of each of the FIGS. 2A through 2Z.
Figure 2B:
Figure 2C:
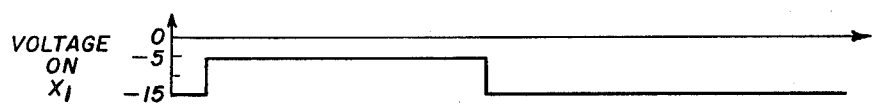
Figure 2D:
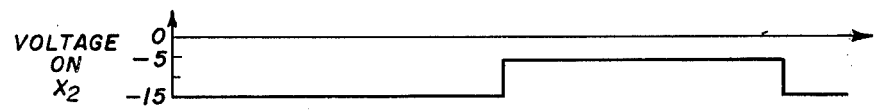
Figure 2E:
Figure 2F:
Figure 2G:
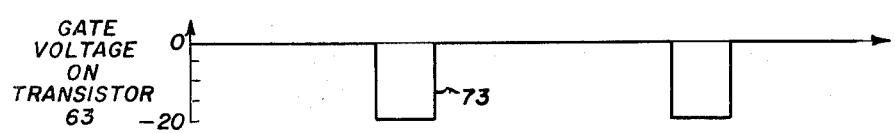
Figure 2H:
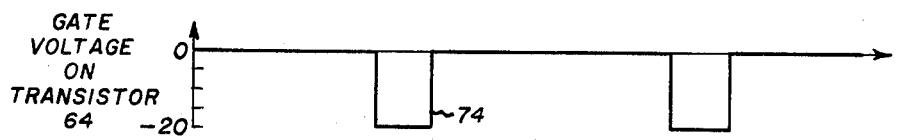

The system of FIG. 1 will be described in connection with FIGS. 2A–2U which show diagrams of amplitude versus time drawn to a common time scale of signals occurring at various points in the system of FIG. 1. The point of occurrence of a signal of FIGS. 2A–2U is referenced in FIG. 1 by a literal designation corresponding to the literal designation of the figure reference. The amplitudes of the signals of FIGS. 2A–2U are not drawn to a common voltage or current scale for reasons of clarity in explaining the operation of the system in accordance with the present invention.

The system includes a clock pulse generator 11 which develops a series of regularly occurring Y-axis pulses 12 of short duration shown in FIG. 2A, occurring in sequence at instants of time $t_1$–$t_8$ and representing a half scanning cycle of operation of the array. The output of the clock pulse generator 11 is applied to a first counter 13 which divides the count of the clock pulse generator by four to derive X-axis clock pulses 14, such as shown in FIG. 2B. The output of the first counter 13 is also applied to a second counter 15 which further divides the count applied to it by four to provide frame synchronizing pulses to the frame sync generator 16.

The sensing array 10 includes row conductor lines $X_1$ thru $X_4$ and column conductor lines $Y_1$ thru $Y_4$. The drive circuits for the row conductor lines $X_1$–$X_4$ and for the column conductor lines $Y_1$–$Y_4$ of array 10 are included on the same substrate 17 which is grounded as is the array to minimize the number of external connections which are required to be made for utilizing the array 10 in the system. A plurality of row line analog switches 21–24, in the form of MOSFET transistor devices, each having a source electrode, a drain electrode and a gate electrode, are provided. Each of the sources of devices 21–24 is connected to one end of a respective one of the row conductor lines $X_1$–$X_4$ and each of the drain of the devices 21–24 is connected to a row line bias terminal 25. Terminal 25 is connected to the negative terminal of a —15 volt source 26, the positive terminal of which is connected to ground. Similarly, a plurality of column line analog switches 31–34 in the form of MOSFET devices, each having a source electrode, a drain electrode and a gate electrode, is provided. Each of the sources of the devices 31–34 is connected to one end of a respective one of column conductor lines $Y_1$–$Y_4$ and each of the drains of the devices 31–34 connected to bias terminal 25. The MOSFET transistors 21–24 and 31–34 are P-channel devices. Accordingly, when the gate electrode of such a device is appropriately negatively biased with respect to the source electrodes a resistance is provided between source and drain, and conversely in the absence of such bias a high resistance is presented between the source and drain. Gating of the other ends of the row conductor lines $X_1$–$X_4$ is provided by a plurality of MOSFET transistors 41–44 formed integrally on the substrate 17, each having a drain electrode connected to the other end of a respective one of the row conductor lines $X_1$–$X_4$ and each having a source electrode connected to a row line biasing contact 45 which in the operation in the system is connected to the negative terminal of a —5 volt source 47 the positive terminal of which is connected to ground. Each of the gate electrodes of the transistors 41–44 is driven by a respective drive signal derived from the row shift register 49. The row shift register 49 may be any of a number of shift registers known to the art. The elements of the shift register 49 may be concurrently formed on the substrate at the same time that the devices of the image sensing array 10 are formed.

The shift register 49 is provided with a terminal 51 to which is applied a train of vertical scanning rate clock or X-axis pulses 14, such as shown in FIG. 2B, the recurrence rate of which is one-fourth the recurrence rate of the Y-axis clock pulses. Frame synchronizing pulses derived from counter 15 are applied to frame sync pulse generator 16 to develop an output which is applied to frame synchronizing terminal 53. Each of the frame synchronizing pulses has a duration equal to substantially the sum of the periods of four cycles of Y-axis clock pulses. The frame synchronizing pulses are shifted in the shift register 106 at the X-axis clock rate to cause successive energization of the gate electrodes of the transistors 41–44 connected, respectively, to the lines $X_1$ thru $X_4$ to successively shift the pulse voltage between a —15 volt value and a —5 volt value. The wave form of the drive voltage on line $X_1$ is shown in FIG. 2C and the wave form of drive voltage on line $X_2$ is shown in FIG. 2D for one-half of the cycle of operation of the array.

Also integrally formed on the substrate 10 are a plurality of column conductor line drive MOSFET transistors 61–64. Each of the transistors 61–64 has a drain electrode connected to the other end of a respective one of column conductor line $Y_1$–$Y_4$. The sources electrodes 111 and 113 are connected to line terminal 65$a$ and the source electrodes of transistors 62 and 64 are connected to line terminal 65$b$. The gate electrodes of the transistors 61 and 62 are connected to a point or stage on the column shift register 66 and gate electrodes of transistors 63 and 64 are connected to a successive point or stage on the shift register 66. The column lines $Y_1$ and $Y_2$ will be referred to as a set of consecutively numbered column lines and column lines $Y_3$ and $Y_4$ will be referred to as a successive set of consecutively numbered column lines. Each of the sets have the same number of lines. Lines $Y_1$ and $Y_3$ are the first lines in their sets and lines $Y_2$ and $Y_4$ are the second lines in their sets. The column shift register 66 is provided with an input terminal 67. A divide-by-two counter 70 is connected between clock pulse generator 11 and terminal 67 to provide pulses of one half the repetition rate of Y-axis clock pulses. The column shift register 66 is also provided with a line synchronizing terminal 68 to which line synchronizing pulses are applied from line sync pulse generator 69. The line sync pulse generator 69 is connected to the counter 13 and provides an output synchronized with X-axis clock pulses. The line sync pulses are shifted in the column shift register in response to pulses of one-half Y-axis clock pulse rate from counter 70. The wave form of the line synchronizing pulse applied to the line synchronizing terminal 68 is shown in FIG. 2E which also represents the output of the first stage of the column shift register 66. The line synchronizing pulse has a width less than the interval between a pair of Y-axis clocking pulses. At output terminal points of the column shift register 66 gating voltages 71–74 shown, respectively, in FIGS. 2E–2H are obtained and are applied respectively to transistors 61–64. The gating signals have —20 volts amplitude for the interval indicated. The gating voltages 71 and 72 applied to transistors 61 and 62 respectively are identical and similarly the gating voltages 73 and 74 applied to the transistors 63 and 64 respectively are identical.

Figure 2I:
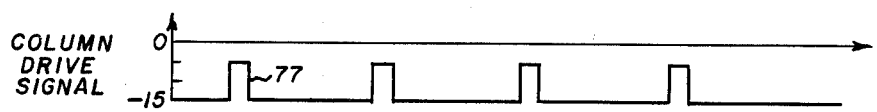

Column line drive pulses 77 are obtained from column driver 75, the input of which is obtained for timing and control circuit block 76 and provides pulses of one-half Y-axis clock rate such as shown in FIG. 2I. The output of the driver 75 is connected to the first drive line terminal by integrating capacitor C1 and is also connected to the second drive line terminal 65b by integrating capacitor C2. Each of the pulses 77 are of short duration corresponding to the time during which it is desired to read out the radiation-produced charge stored in a device in a single column or in a plurality of columns as will be explained below. Such pulses cause injection of stored charge which is sensed across the integrating capacitors. The pulses 77 are 10 volts in amplitude between the −15 and −5 volt levels. Accordingly, during the time interval from $t_0$ to $t_1$ two radiation sensing cell pairs in the uppermost row and in the first set connected to lines $Y_1$ and $Y_2$ are read out followed by the devices in the second set connected to lines $Y_3$ and $Y_4$ which are read out during the time interval from $t_2$ to $t_3$.

Figure 2J:

After the completion of the scanning of the cell pairs of a row, gating pulses 81 such as shown in FIG. 2J are applied to the gates of each of the devices 21–24 and 31–34 to connected lines $X_1$–$X_4$ and $Y_1$–$Y_4$ to the source 26 of operating potential which establishes proper depletion producing potential on all of the plates of all of the MIS cell pairs. As shown each gating pulse 81 occurs after the column drive pulse 77 driving the last cell pair in each row. The gating pulse occurs subsequent to the output of stage 2 of the column shift register. The duration of the gating pulses is selected to be sufficient to reestablish the −15 volt storage potential on all of the lines. The gating pulses are derived from gate generator 85 which in turn is driven by a counter 86 which provides an output pulse for every four input pulses. The counter is driven by the Y-axis clock pulses from the clock pulse generator 11.

In the operation of the system described, first the column lines $Y_1$ and $Y_2$ of the first set are connected to their respective terminals 65a and 65b by a gating pulse on transistors 61 and 62 and a column drive pulses are applied to the lines through respective integrating capacitors C1 and C2 to cause charge to be injected into the substrate and to be sensed on the integrating capacitors C1 and C2 in the drive line circuits. After the capacitors C1 and C2 have been reset, the second set of transistors 63 and 64 is gated to connect lines $Y_3$ and $Y_4$ to line terminals 65a and 65b respectively and a column drive pulse is applied to inject stored charge into the substrate and to be sensed in capacitors C1 and C2.

Figure 2K:
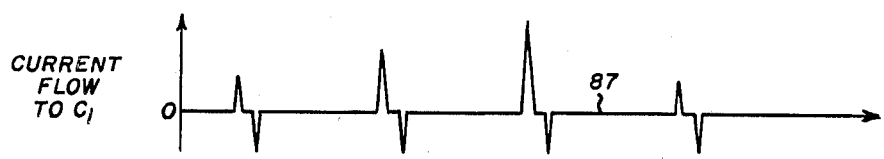
Figure 2L:
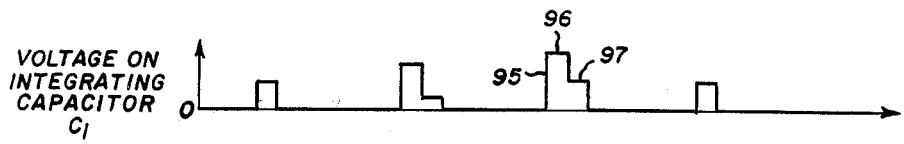
Figure 2M:
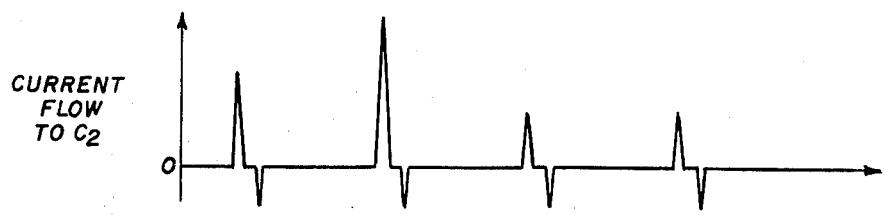

The current flow in the drive line circuit of capacitor C1 in response to a sequential scanning of the devices in the first and second rows of the array is depicted in the graph 87 of FIG. 2K. In FIG. 2K there are shown four pairs of current pulses corresponding respectively to the current flow in the drive line circuit of capacitor C1 during the read out of the first and third cell pairs of the first and second rows $X_1$ and $X_2$ in sequence. The first occurring pulse of each pair corresponds to current flow due to radiation produced charge and to some of the depletion producing charge stored at the instant of application of storage potential to the column-oriented plate of the cell pair. The second occurring pulse corresponds to the aforementioned current flow resulting from the application of voltage to the column-oriented plate of the cell pair. The first pulse of each pair occurs at the leading edge of a respective one of the column drive pulses 77 and the second pulse of each pair occurs at the lagging edge of a respective one of the column drive pulses. The first pulses are shown of various amplitudes corresponding to various magnitudes of charge stored in the various devices of the first two rows. The amplitudes of the second pulses are identical as the column-oriented cells of each of the cell pairs are identically constituted and hence would take identical charging or depletion region producing current. The pulses of FIG. 2K are integrated by capacitor C1 and the pulses of FIG. 2M are integrated by capacitor C2.

Figure 2N:
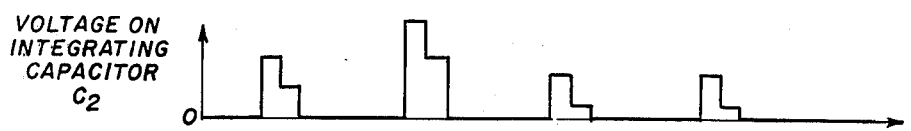
Figure 2O:
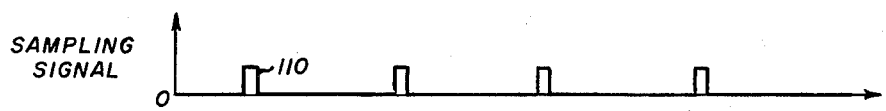
Figure 2P:
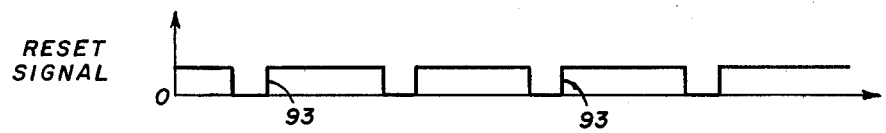

A field effect transistor 90 is provided having its source to drain circuit connected between terminal 65a and the negative terminal of a −15 volt source 91, the positive terminal of which is connected to ground for resetting capacitor C1. Similarly another field effect transistor 92 is provided having its source to drain circuit connected between terminal 65b and the negative terminal of the source 91. The gates of the transistor 90 and 92 are connected to the timing and control circuits block 76 which provides reset pulses 93 as shown in FIG. 2P. The reset pulses switch from a positive voltage level to ground to turn the transistors off. The leading edge of each reset pulse is coincident with the leading edge of a respective one of column line drive pulses 77. Accordingly, except during the read out interval for the first and third cell pairs of each row capacitor C1 is shorted or bypassed to ground. Also, except during the read out interval for the second and fourth cell pairs of each row capacitor C2 is shorted or bypassed to ground. On occurrence of a column drive pulse, a pair of current pulses as mentioned above are produced which are integrated by the capacitors C1 and C2 and result in a corresponding two level output pulse, the first level corresponding to the charge of the first current pulse and the second level corresponding to the charge of the first current pulse less the charge of the second current pulse. The output across capacitor C1 is shown in the diagram of FIG. 2L in which each of the two leveled pulses 95 having a first level 96 and a second level 97 correspond respectively to a respective pair of pulses of FIG. 2K. In the case of the first pulse and fourth pulse of FIG. 2L the second level is zero indicating that no radiation produced charge had been stored in the devices corresponding thereto. The output across capacitor C2 is shown in the diagram of FIG. 2N.

Figure 2Q:

The output appearing across the integrating capacitor C1 is applied to a first video channel comprising a differential amplifier 101 and a sample and hold circuit to provide a first video output. The sample and hold circuit includes transistor 104 having a drain 103, a source 104 and a gate 105 and a capacitor C3. The source to drain current flow path of the transistor 102 is connected between the output of the amplifier 101 and one terminal 107 of the capacitor C3, the other terminal of which is connected to ground. The gate 105 is connected to the sample pulse generator 108 which is controlled by the timing and control circuits block 76 and provides the train of sampling pulses 110 shown in the graph FIG. 2O. Each of the pulses 110 are of short duration and are equally spaced along the time axis of the graph. One sampling pulse occurs for every other Y-axis clock pulse. Each of the pulses 110 are phased to occur during the occurrence of the back porch or second level of the two level video pulses of FIG. 2L appearing on the integrating capacitor C1. During the sampling intervals the transistor 102 is turned on so as to permit capacitor C3 to charge in turn to a voltage corresponding to the voltage 108 of the second levels of the pulses 95 of FIG. 2L. Accordingly, a first video signal 111 such as shown in FIG. 2Q is obtained at terminal 107 in which the signal shifts from one video level to another at the sampling interval in accordance with the voltage on the integrating capacitor C1 during the sampling interval.

Figure 2R:
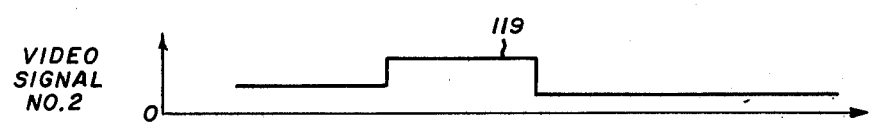

Similarly the output appearing across the integrating capacitor C2 is applied to a second video channel comprising differential amplifier 113 and a sample and hold circuit to provide a second video output. The sample and hold circuit includes a transistor 114 having a drain 115, a source 116 and a gate 117 and a capacitor C4. The source to drain current flow path of the transistor 164 is connected between the output of the amplifier 113 and one terminal 118 of the capacitor C4, the other electrode of which is connected to ground. The gate 117 is connected to the sample pulse generator 108. During the sampling intervals of pulses 110 the transistor 114 is turned on so as to permit capacitor C4 to charge in turn to a voltage corresponding to the second levels of the pulses of FIG. 2N. Accordingly, a second video signal 119 such as shown in FIG. 2R is obtained at terminal 118 in which the signal shifts from one video level to another at the sampling interval in accordance with the voltage on the integrating capacitor C4 during the sampling interval.

Figure 2S:
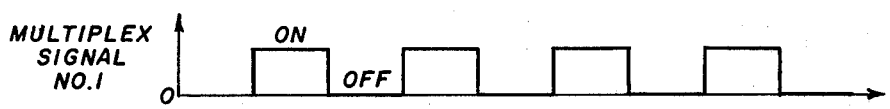
Figure 2T:
Figure 2U:
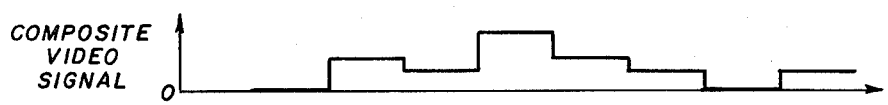

The first and second video signals obtained at terminals 107 and 118 are multiplexed by multiplex circuit 120 to obtain a composite video signal. The multiplex circuit includes a pair of transistors 122 and 123 and a multiplex pulse generator 124. The source to drain current flow path of transistor 122 is connected between terminal 107 and an input 125 of differential amplifier 121 and the source to drain current flow path of transistor 123 is connected between terminal 118 and the input of amplifier 121. The multiplex pulse generator 124 controlled by block 76 develops the multiplexing pulses shown in FIGS. 2S and 2T. The pulses of FIG. 2S are applied to the gate electrode of transistor 122 and the pulses of FIG. 2T are applied to the gate electrode of transistor 124. When one of multiplexing pulse signals gates transistor 122 on as shown in FIG. 2S, a segment of video signal of FIG. 2Q appears at the input 125 of differential amplifier 121. Similarly when the other of the multiplexing signals gates transistor 124 on as shown in FIG. 2T, a segment of video signals of FIG. 2R appears at the input 125 of differential amplifier 121. The composite output resulting from the multiplexing of video signal No. 1 and video signal No. 2 appears in FIG. 2U.

The foregoing description is in accordance with the features of the invention described in the aforementioned Eighelberger et al. patent application Ser. No. 441,054. The present invention is directed to an improvement for such systems which have multiple video channels.

Figure 2V:
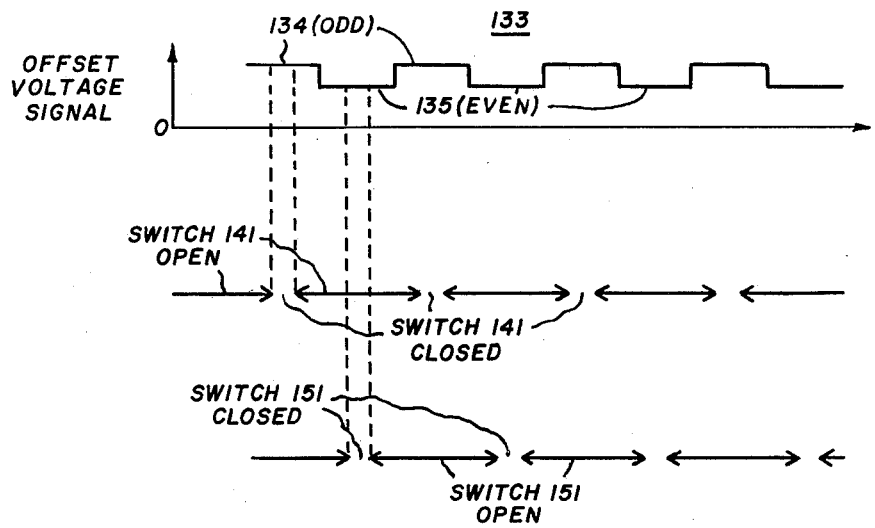

The composite output shown in FIG. 2U is in actuality only a representation of an ideal situation in which the corresponding circuit components of video channels No. 1 and No. 2 are perfectly matched. For example, a mismatch normally occurs due to a mismatch (1) in the characteristics of the corresponding channel components such as field effect transistors 90 and 91 and capacitor C3 and C4; (2) in the capacitive loading on the lines of video channels No. 1 and No. 2; and (3) in the output of differential amplifiers 101, 113. This causes a relatively constant D.C. error or offset voltage to be introduced into the composite due to the non-identical signal processing of the video signals in video channels No. 1 and No. 2. For example, when the array 10 is focused on a uniformly flat scene such as a white screen the composite video output is a D.C. offset (or error) voltage square wave 133 as illustrated in FIG. 2V for one-half cycle of operation of the array. The square wave 133 is comprised of a series of positive going pulses 134 (hereinafter "odd" pulses) corresponding to a first D.C. voltage impressed upon the video signal from the odd-numbered column lines $Y_1$ and $Y_3$ and a series of negative going pulses 135 (hereinafter "even" pulses) corresponding to a second D.C. voltage impressed upon the video signal from the even numbered column lines $Y_2$ and $Y_4$. This causes a display of a video frame of information to have columns of alternating intensity.

The difference in magnitude between the aforesaid first and second D.C. voltages is defined to be the "D.C. offset or error voltage".

In FIG. 1B a correction circuit 130 is shown in accordance with the invention herein for generating a correction signal which is provided as an input into an input 127 of differential amplifier 121, thereby to cancel the D.C. offset voltage from the composite video signal.

The correction circuit 130 includes odd and even sampling circuit means for sampling the odd pulses 134 and the even pulses 135, respectively. The odd sampling circuit means comprises a switching means 141 which can be, as shown, a JFET transistor, a sample pulse generator 143 connected to the gate of transistor 141, and a holding capacitor 145 connected to the drain electrode of transistor 141. The sample pulse generator 143 is driven by the timing and control circuits 76. In turn, the generator 143 appropriately biases the gate of transistor 141 to switch the transistor 141 from a normally open condition to a closed condition for short discrete time intervals. Each interval is sufficient to permit the capacitor to charge to the voltage level of a pulse 135, thereby to repetitively sample the odd pulses 135 onto holding capacitor 145. The time constant for holding capacitor 145 is chosen such that the sample voltage thereon, corresponding to the voltage level of a first pulse 135, is held until a second pulse 135 is sampled onto the holding capacitor 145.

Similarly, the even sampling circuit means is comprised of a switching means JFET transistor 151, an even sample pulse generator 153 connected to the gate of transistor 151 and a holding capacitor 155 connected to the drain electrode of transistor 151. The even sampling circuit means operates in an analogous manner to the odd sampling circuit. The even sample pulse generator 153, controlled by the timing and control circuit means 76, biases the switching transistor 151 from its normally open position to a closed position for short discrete intervals of time to sample the even pulses 135 onto holding capacitor 155.

The voltages stored on holding capacitors 145, 155 respectively provide slightly varying D.C. input signals to a differential integrator 161, thereby to continuously compare the voltage level of consecutive odd and even pulses 134, 135 and to integrate the D.C. offset voltage therebetween.

Figure 2W:
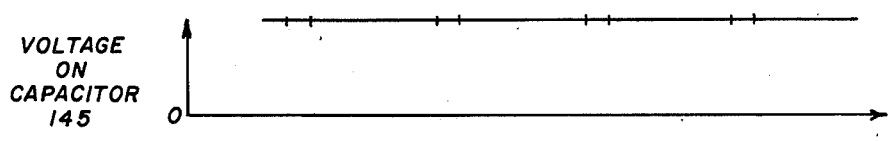
Figure 2X:
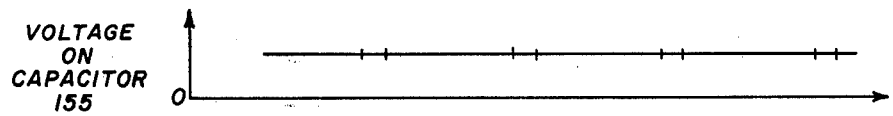
Figure 2Y:
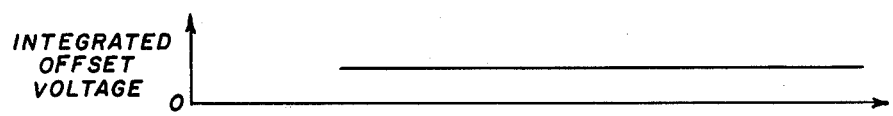

The waveforms for the inputs from capacitors 145, 155 to the differential integrator and for the output from the differential integrator 161 are shown in FIGS. 2W, 2X and 2Y, respectively.

In accordance with the features of this invention, the time constant of the differential integrator 161 is chosen such that the integrator 161 will be slowly responsive to transient changes in the offset voltage. The input signals to the integrator 161 are continually being updated because, as noted above, each odd and even pulse is sampled onto capacitors 145 and 155, respectively. The time constant for the differential integrator 161 is preferably between one to five times the frame time for the array 10, but it can be varied therefrom. The output of the integrator 161 (FIG. 2Y) substantially corresponds to the average of offset voltages taken over the time constant of the integrator 161 and thus the signal shown in FIG. 2Y which represents a one-half frame signal is linear. However, when taken over a longer period of time, e.g., two to three times the frame time, the output signal of integrator 161 can normally be seen to vary slightly, which variations represent changes in the offset voltage.

The use of the average offset voltage is preferred because the correction signal is applied to correct a portion of the video signal which is later in time relative to the signal portion providing an instantaneous input into the correction circuit 130 via the output of amplifier 121. The average offset voltage can be transformed into an effective correction signal irrespective of whether the scene being viewed is of uniform or random intensity. In the case of a random scene, the differences in signals from consecutive columns due to differences in the input radiation to the cell pairs of the columns cancel out when averaged over a sufficient length of time, thereby leaving only a D.C. offset voltage signal at the output of integrator 161. However, as will be appreciated by those skilled in the art, the correction circuit is ineffective to generate a proper correction signal where by coincidence differences in the video signal from consecutive columns simulate the characteristics of a D.C. offset voltage signal and cannot be distinguished by the correction circuit therefrom.

Figure 2Z:
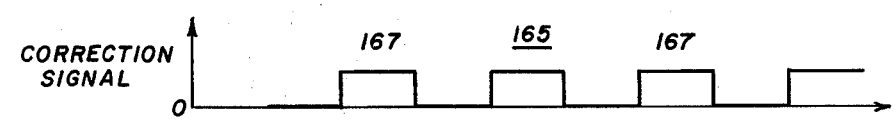

The differential integrator 161 is connected to a modulator 163 which chops the D.C. output of the integrator 161 at one-half the frequency of the composite video signal (FIG. 2V) responsive to control signals from timing and control circuits 76. As shown in FIG. 2Z the output of modulator 163 is a square wave 165 having an equal period and opposite phase to that of the composite DC offset (or error) waveform 133 (FIG. 2V). The positive going pulses 167 of the square wave 165 have an amplitude equal in magnitude to the D.C. offset (or error) voltage. The waveform 165 is applied to the non-inverting input 127 of differential amplifier 121 and is "added" therein to the composite video signal which is applied to the inverting input 125 of differential amplifier 121. This acts to null or cancel the D.C. offset voltage.

What I claim as new and desire to secure by Letters Patent of the United States is:

1. An imaging system comprising
   a. a two-dimensional array of sensing sites of MIS cell pairs, said sensing sites being arranged in a matrix of rows and columns;
   b. a plurality of column lines, each connected respectively to the sensing sites of each column, said lines arranged in a plurality of consecutively numbered sets, each set including the same number of consecutively numbered lines;
   c. a plurality of charge integrating means connected to one of said lines of each set, respectively, for simultaneous readout of charges through the lines of at least one said set;
   d. switch means for connecting each said set, in turn, for readout;
   e. a plurality of video channel circuits, respectively, in circuit with each said integrating means for respectively transmitting an output signal from each said integrating means; and
   f. a correction circuit means in circuit with said plurality of video channel circuit means for generating a correction signal to cancel a D.C. offset voltage between the output signals on said video channel circuit means.

2. The system of claim 1 further comprising multiplexing means connected between said plurality of video channel circuit means and said correction circuit means for multiplexing said outputs to provide a composite video signal.

3. The system of claim 2 further comprising signal adding means having a first input connected to the output of said multiplexing means and a second input connected to the output of said correction circuit means.

4. The system of claim 1 wherein said correction circuit means further comprises differential integrating means for integrating said offset voltage to generate an output signal substantially corresponding to the difference between an average of the outputs of the cell pairs of the odd numbered columns and an average of the outputs of the cell pairs of the even numbered columns.

5. The system of claim 4 wherein said correction circuit means further comprises an odd sampling circuit means for providing a continuous time variable signal corresponding to the outputs of the cell pairs on said odd numbered column lines, said odd sampling circuit signal providing a first input to said differential integrating means and an even sampling circuit means for providing a continuous time variable signal corresponding to the outputs of the cell pairs on said even numbered column lines, said even sampling circuit signal providing a second input to said differential integrating means.

6. The system of claim 5 wherein said correction circuit further comprises a modulator means connected to said differential integrating means for modulating the output of said differential integrating means to generate said correction signal, said correction signal being comprised of a square wave opposite in phase and equal in period to the composite video output.

7. The system of claim 6 further comprising multiplexing means connected between said plurality of video channel circuit means and said correction circuit means for multiplexing said video channel outputs to provide a composite video signal.

8. The system of claim 7 further comprising signal adding means having a first input connected to the output of said multiplexing means and a second input connected to the output of said modulator means.

9. An imaging system comprising
a. a semiconductor substrate having a major surface;
b. a first and a second plurality of conductive plates, each overlying and in an insulated relationship to said major surface thereby to form first and second pluralities of MIS capacitors, respectively, each of said first MIS capacitors being adjavent and coupled to a respective one of said second MIS capacitors to form a plurality of pairs of MIS capacitors, said pairs arranged in a matrix of rows and columns;
c. a plurality of column conductor lines arranged in plurality of consecutively numbered sets, each set having an equal number of consecutively numbered lines, each line connected to the second plates of each column, respectively;
d. a plurality of column switches;
e. a plurality of consecutively numbered terminals equal in number to the number of sets, each line connected through a respective one of said column switches to the terminal corresponding in number to the set number of said line;
f. a plurality of row conductor lines, each row line connected to said first plates of each row, respectively;
g. a first voltage means for providing a first voltage between said row conductor lines and said substrate to deplete respective first portions of said substrate lying thereunder of majority charge carriers;
h. a second voltage means connected in circuit between each set of said column conductor lines and said substrate for providing a second voltage between said column conductor lines and said substrate to deplete respective second portions of said substrate lying thereunder of majority charge carriers, said substrate maintained at a fixed potential in relation to said second voltage means;
i. means for exposing said substrate to radiation whereby charge is stored in said first and second portions of said substrate;
j. first means for collapsing and reestablishing said first voltage on each of said row conductor lines in sequence during a respective period of time;
k. means for actuating the column switches of each set during a respective second period of time whereby the column lines of each set are connected in turn to said terminals;
l. a plurality of circuit means each connected between a respective one of said terminals and said second voltage means;
m. second means for collapsing and reestablishing said second voltage on said terminals during said second periods of time, whereby charge stored in the second semiconductor capacitors of each set is simultaneously driven out of said respective second capacitors and currents are caused to flow simultaneously in each of said circuit means;
n. each of said circuit means including means for integrating each of said current flows with respect to time to provide a respective output of sequentially occurring levels of voltage;
o. a plurality video channel circuit means each connected to respective ones of said integrating means for providing a plurality of video channel outputs;
p. correction circuit means, connected to said plurality of video channel circuit means for generating a correction signal to cancel a D.C. offset voltage between said video channel outputs.

10. The system of claim 9 further comprising multiplexing means connected between said plurality of video channel circuit means and said correction circuit means for multiplexing said outputs to provide a composite video signal.

11. The system of claim 10 further comprising signal adding means having a first input connected to the output of said multiplexing means and a second input connected to the output of said correction circuit means.

12. The system of claim 9 wherein said correction circuit means further comprises differential integrating means for integrating said offset voltage to generate an output signal substantially corresponding to the difference between an average of the outputs of the cell pairs of the odd numbered columns and an average of the outputs of the cell pairs of the even numbered columns.

13. The system of claim 12 wherein said correction circuit means further comprises an odd sampling circuit means for providing a continuous time variable signal corresponding to the outputs of the cell pairs on said odd numbered column lines, said odd sampling circuit signal providing a first input to said differential integrating means and an even sampling circuit means for providing a continuous time variable signal corresponding to the outputs of the cell pairs on said even numbered column lines, said even sampling circuit signal providing a second input to said differential integrating means.

14. The system of claim 13 wherein said correction circuit further comprises a modulator means connected to said differential integrating means for modulating the output of said differential integrating means to generate said correction signal, said correction signal being comprised of a square wave opposite in phase and equal in period to the composite video output.

15. The system of claim 14 further comprising multiplexing means connected between said plurality of video channel circuit means and said correction circuit means for multiplexing said video channel outputs to provide a composite video signal.

16. The system of claim 15 further comprising signal adding means having a first input connected to the output of said multiplexing means and a second input connected to the output of said modulator means.

* * * * *